(12) United States Patent
Rodgers

(10) Patent No.: US 7,040,548 B2
(45) Date of Patent: May 9, 2006

(54) RESIDUAL FREE SCENT DISPENSER AND METHOD

(76) Inventor: Steven Scott Rodgers, 121 Field Ave., East Peoria, IL (US) 61611

( * ) Notice: Subject to any disclaimer, the term of this patent is extended or adjusted under 35 U.S.C. 154(b) by 153 days.

(21) Appl. No.: 10/246,097

(22) Filed: Sep. 19, 2002

(65) Prior Publication Data

US 2003/0051387 A1   Mar. 20, 2003

Related U.S. Application Data

(60) Provisional application No. 60/323,753, filed on Sep. 20, 2001.

(51) Int. Cl.
- A24F 25/00    (2006.01)
- A61L 9/04     (2006.01)
- B01D 47/00    (2006.01)
- F02M 37/00    (2006.01)

(52) U.S. Cl. .................. 239/34; 239/60; 239/57; 43/1; 261/30; 261/DIG. 88

(58) Field of Classification Search ............ 239/34, 239/60, 57; 43/1; 261/30, DIG. 88; 422/124
See application file for complete search history.

(56) References Cited

U.S. PATENT DOCUMENTS

| | | | |
|---|---|---|---|
| 4,111,655 A * | 9/1978 | Quincey | 422/124 |
| 4,301,095 A * | 11/1981 | Mettler et al. | 261/30 |
| 4,604,245 A * | 8/1986 | Gutierrez | 261/26 |
| 4,666,638 A * | 5/1987 | Baker et al. | 261/26 |
| 4,840,770 A * | 6/1989 | Walz et al. | 422/49 |
| 4,953,763 A | 9/1990 | Kierum | |
| 4,989,547 A | 2/1991 | Eaton | |
| 5,147,582 A * | 9/1992 | Holzner et al. | 261/30 |
| 5,282,334 A | 2/1994 | Kimura | |
| 5,305,541 A | 4/1994 | Simpson | |
| 5,307,584 A | 5/1994 | Jarvis | |
| 5,429,271 A | 7/1995 | Porter | |
| 5,622,314 A | 4/1997 | Eason | |
| 5,735,918 A * | 4/1998 | Barradas | 96/222 |
| 5,832,648 A | 11/1998 | Malone | |
| 5,851,106 A | 12/1998 | Steiner | |
| 5,857,281 A | 1/1999 | Berquist | |
| 5,970,643 A | 10/1999 | Gawel | |
| 6,004,516 A | 12/1999 | Rasouli | |
| 6,050,016 A | 4/2000 | Cox | |
| 6,085,989 A | 7/2000 | Cox | |
| 6,102,301 A | 8/2000 | Tiedemann | |
| 6,241,161 B1 | 6/2001 | Corbett | |
| 6,592,104 B1 * | 7/2003 | Cox | 261/26 |

* cited by examiner

Primary Examiner—David A. Scherbel
Assistant Examiner—Darren Gorman
(74) Attorney, Agent, or Firm—Golden's M & I; James B Golden (57) ABSTRACT

A residual free scent dispenser for dispersion of scent having a housing and a scent container having a scent permeating material disposed therein. The housing has an air intake port and an air exhaust port. The scent container has at least one perforation and is disposed in the air exhaust port. Air is drawn into the housing through the air intake port and exhausted through at least one perforation of the scent container passing air over the scent permeating material. The principle use is for hunting, however other scent dispersing uses will benefit from this invention. For example, home or car applications will benefit from this invention.

13 Claims, 8 Drawing Sheets

RESIDUAL FREE SCENT DISPENSER AND METHOD

CROSS REFERENCE

This application claims the benefit of U.S. Provisional Patent Application No. 60/323,753, filed Sep. 20, 2001.

TECHNICAL FIELD

This invention relates generally to scent dispenser and more particularly to a scent dispenser having a scent container with at least one perforation.

BACKGROUND ART

For years it has been a standard practice with hunters to use various scents to attract wild game animals to a particular location. Another common practice is to use various scents such as cedar and earth scent to mask human odor. While some scents attract some animals the same scent may repel others. For instance, in deer hunting, dominant buck urine will usually attract the dominant buck of the area but most often scare away the immature bucks and does. Coyote urine will attract other coyotes, however, it will typically scare away all deer. Prior art in the field of wild game scent dispersal are numerous and varied from fan propelled, heat actuated, dripping type, wick diffused to scent canisters. Primarily, though, they all have one common disadvantage and that is failing to provide a way of eliminating leftover scent residue inside the device itself when switching from one scent to another. Thus ensuring that cross-contamination will take place unless properly cleaned. For example, a hunter starts the day off using dominant buck urine as a scent and sights no deer, then decided mid-day to change to a scent that would increase the chances of seeing any deer. If the scent device is still contaminated with the dominant buck urine it will scare away the immature bucks and does. The prior art devices would require the hunter to have to deodorize the device in between scents and in some instances disassemble the device to do so. This is not convenient in any situation and certainly not convenient or practical in the field in which cleaning agents are usually not at hand.

Prior art devices such as U.S. Pat. No. 5,305,541 to Simpson (1994), U.S. Pat. No. 6,050,016 to Cox (2000), and U.S. Pat. No. 5,970,643 to Gawel (1999), all show a scent device using a fan in which the receptacle to hold the actual scent is located inside of a chamber in the device itself. When air from the fan passed through the chamber it would allow scent molecules to build up on the chamber walls.

Simpson, in U.S. Pat. No. 5,305,541 (1994), shows a game scent dispensing apparatus that has a scent receptacle inside the apparatus in which air from a fan is driven through a tube over the scent and into another chamber before it is expelled. Thus, allowing scent molecules to build up on the chamber walls.

Gawel, in U.S. Pat. No. 5,970,643 (1999), shows an apparatus to enhance the use of scents that has a scent receptacle comprising of a wire with a liquid retaining sponge member on the end to contain the scent hanging from the top of the apparatus cavity. This apparatus would allow the scent to drip onto the cavity bottom as well as scent molecules to collect on the interior walls of the housing.

Malone, in U.S. Pat. No. 5,832,648 (1998), shows a scent dispenser in form of a wicking type. To change scents without cross-contamination in the field a hunter would need to have another wick, cleaning agents, and another container to put prior scent in.

Daniels, in U.S. Pat. No. 5,094,025 (1992), shows an animal scent heater in which the primary housing, wick, heating element, and scent container would have to be deodorized.

Cox, in U.S. Pat. No. 6,050,016 (2000), shows a scent dispenser in which a canister is placed inside a chamber and a fan blows air across the canister through the chamber and out a vent hole. Here again the inner walls of the chamber would allow scent molecules to collect and make the device in need of decontaminating between scent types. Another problem with this design is nothing holds the canister securely in place inside the chamber preventing it from tipping over. Depending on how much scent was inside the canister and at what location in the chamber the canister slid the center of gravity would always change making the hanging apparatus virtually unpredictable and unstable.

For years it has also been a common practice for hunters to arrive in the woods before daylight and leave after sunset. This poses another problem hunters face when using scent dispensing devices in which location and retrieval of such devices is often difficult after dark. A light that would go on in the dark might prove beneficial for this problem but could also be detrimental in the pre-dawn darkness in the event that the light could scare away what you are trying to attract. The aforementioned prior art devices fail to overcome these problems.

The present invention is directed to overcoming one or more of the problems as set forth above.

DISCLOSURE OF THE INVENTION

In one aspect of the present invention, a scent dispenser includes a housing having a mounting surface. An air intake port is defined by a first curvilinear bore and a longitudinal axis. The mounting surface has an air exhaust port that is defined by a second curvilinear bore and an axial axis. A scent container has a third bore defined by a cylindrical surface and a second axial axis. The third bore has a closed end surface. At least one perforation is disposed in the scent container and opens into the third bore. The perforation passes air from the air intake port to the third bore. The scent container is moveably extending through said air exhaust port.

In another aspect of the present invention, a scent dispenser includes a housing having a mounting surface and an air intake port defined by a first curvilinear bore and a longitudinal axis. The mounting surface has at least one perforation disposed therein and an air exhaust port defined by a second curvilinear bore and an axial axis. A scent container has a third bore defined by a cylindrical surface and a second axial axis. The third bore has a closed end surface. The scent container is moveably extending into the air exhaust port. A scent permeating material is disposed in the third bore and extends beyond the mounting surface such that the perforation passes air from the air intake port to the permeating material.

In yet another aspect of the present invention, a method of changing scents having a scent container which has a scent permeating material disposed therein, a second scent container which has a second scent permeating material disposed therein, and a housing having an air exhaust port and a fan fastened to the housing. The method comprises the steps of de-energizing the fan. Removing the first scent container from the air exhaust port of the housing. Placing the second scent container into the scent container port of the housing and energizing the fan.

BEST MODE FOR CARRYING OUT THE INVENTION

Figure 1:
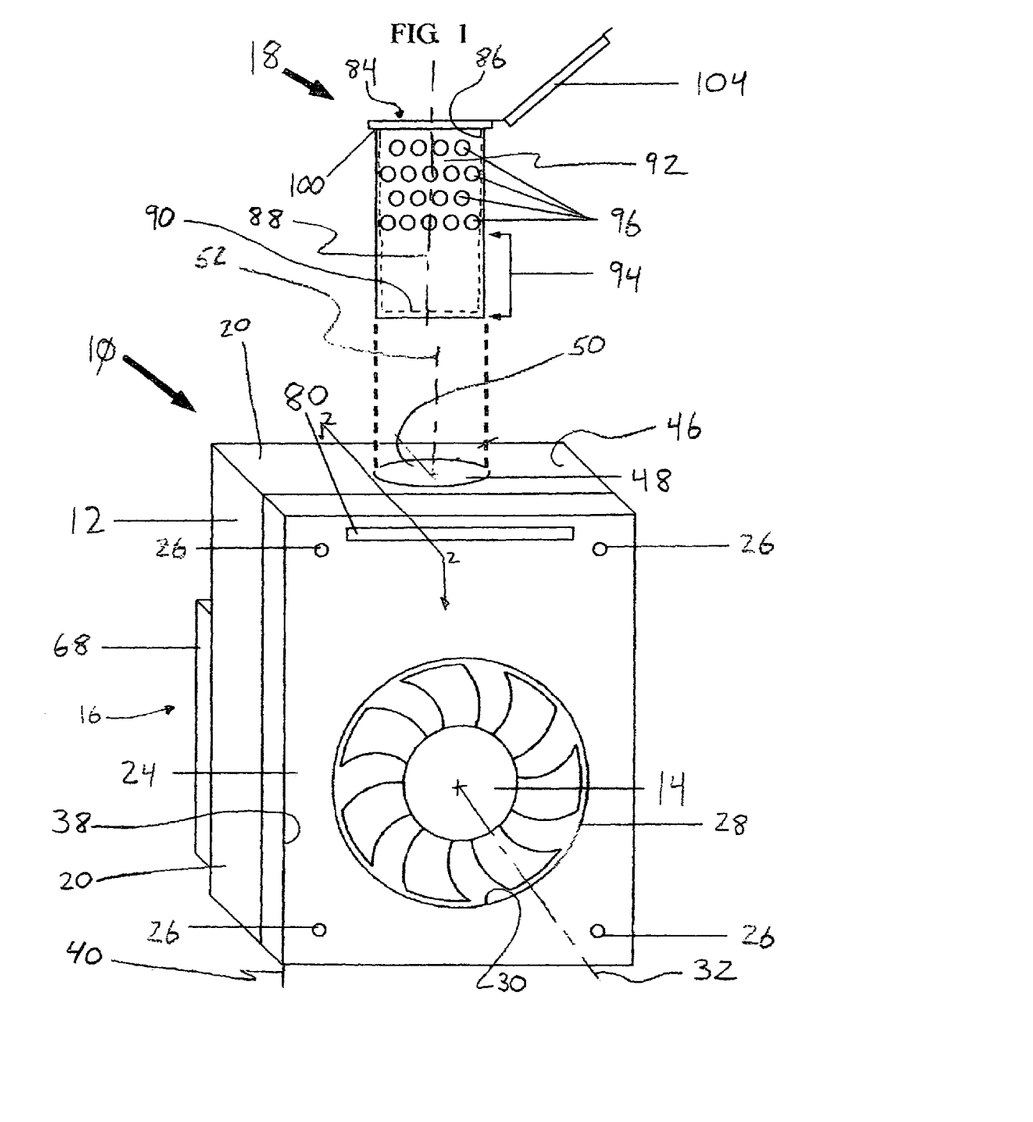
FIG. 1 is a diagrammatic view of a scent dispenser embodying the present invention.

Referring to FIG. 1, a residual free scent dispenser (10) is shown which utilizes a housing (12) for maintaining a fan (14) and a power pack (16) along with a scent container (18) that can be easily changed based on desired conditions. The scents that are typically used for hunting are placed in the scent container (18) thus eliminating scent contamination of the housing (12). The flexibility of the scent container (18) allows hunters to optimize the type of scents they can use without cross-contamination of the housing (12).

Figure 2:
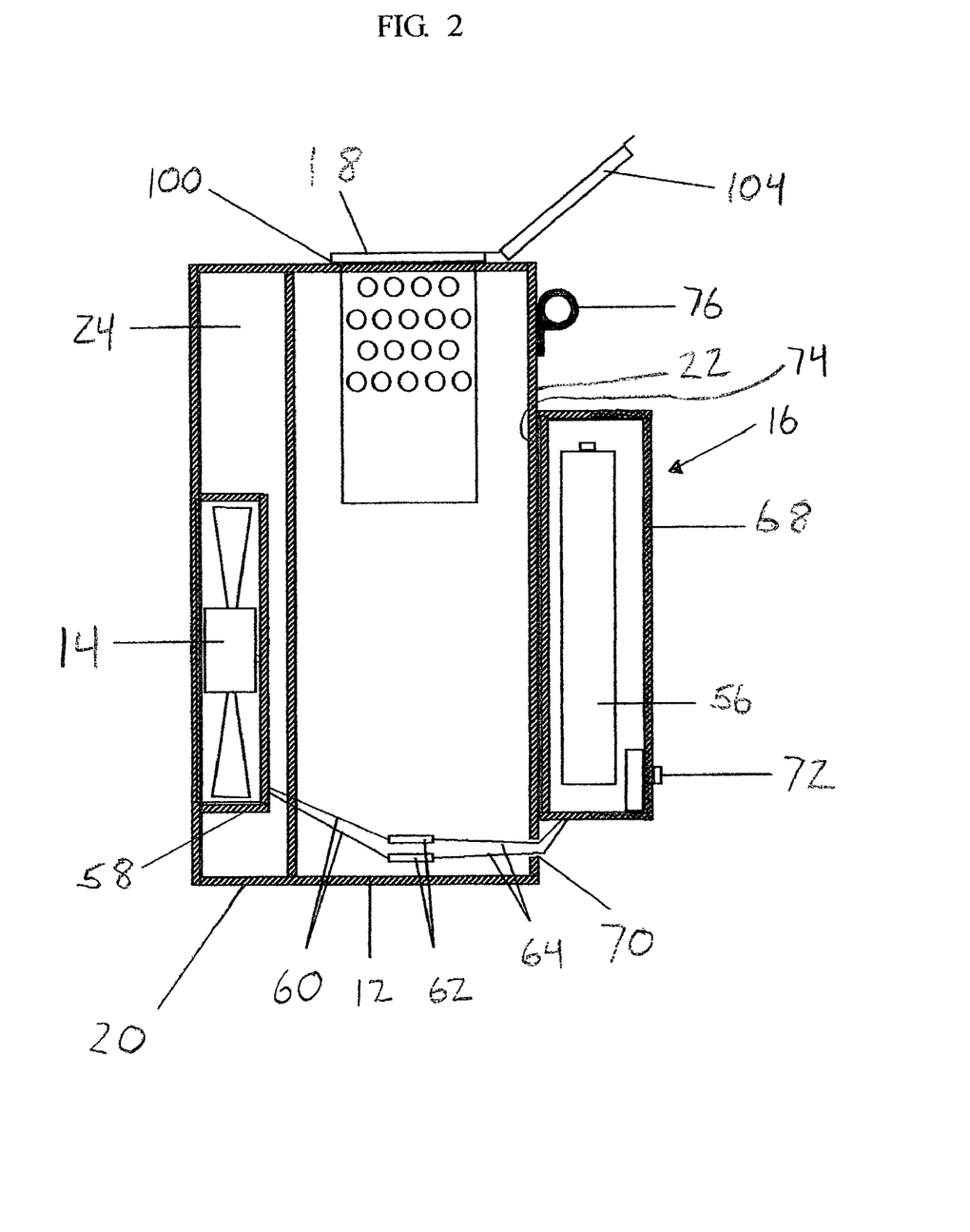
FIG. 2 is a diagrammatic lateral cross-sectional view of a scent dispenser taken along line 2—2 of FIG. 1 embodying the present invention.
Figure 3:
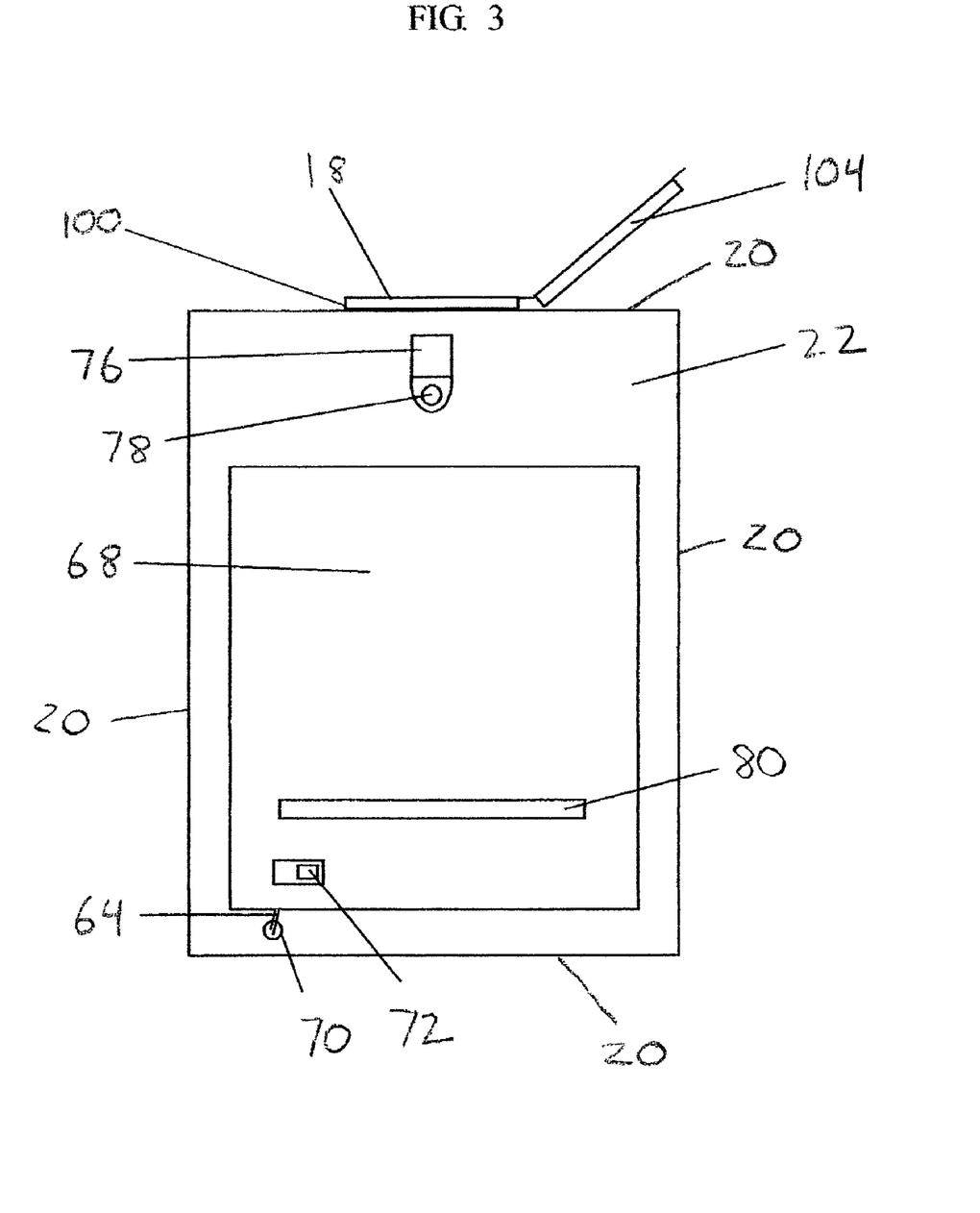
FIG. 3 is a diagrammatic rear perspective of a scent dispenser embodying the present invention.
Figure 4:
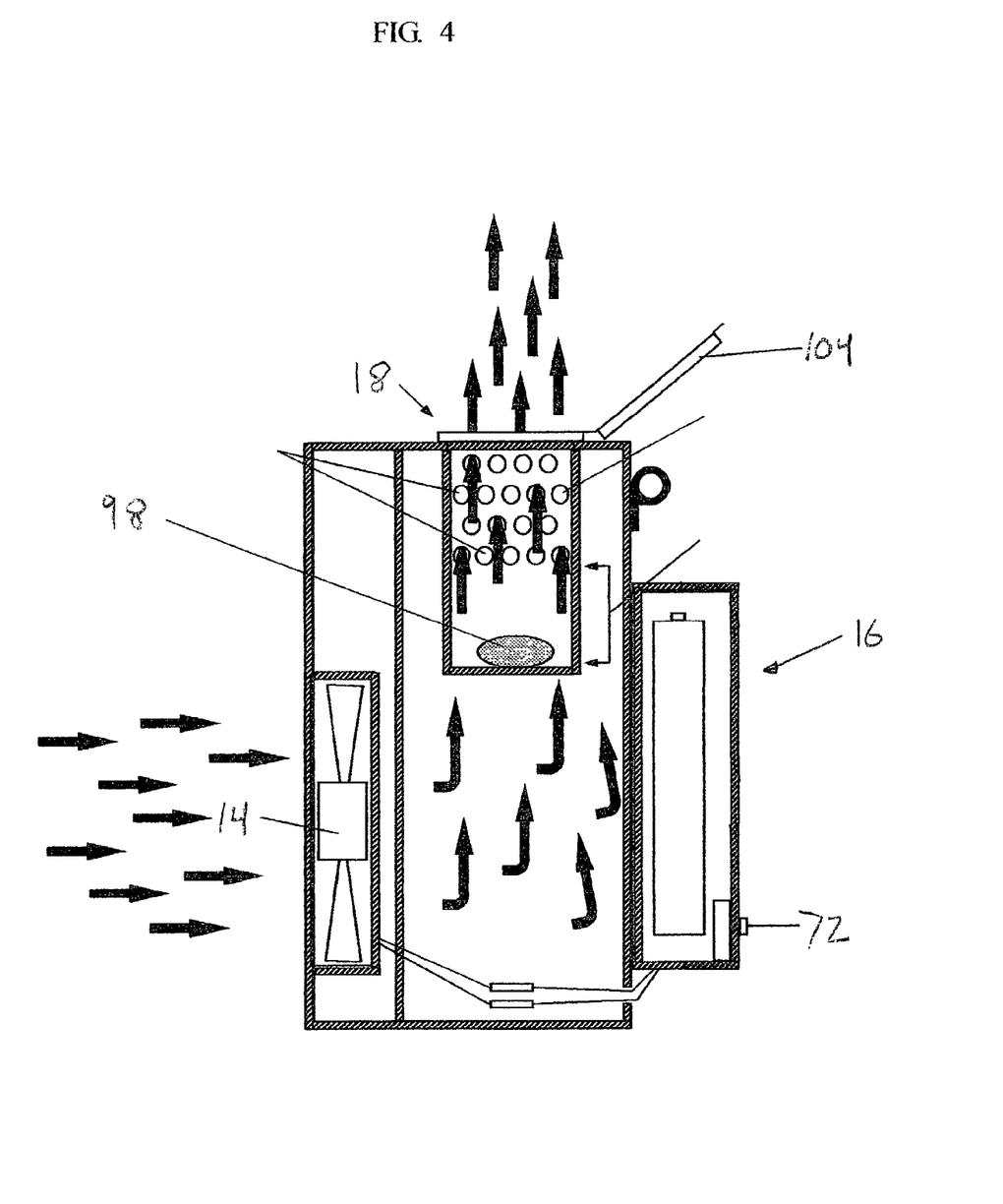
FIG. 4 is a diagrammatic operational view of a scent dispenser taken along line 2—2 of FIG. 1 embodying the present invention.
Figure 5:
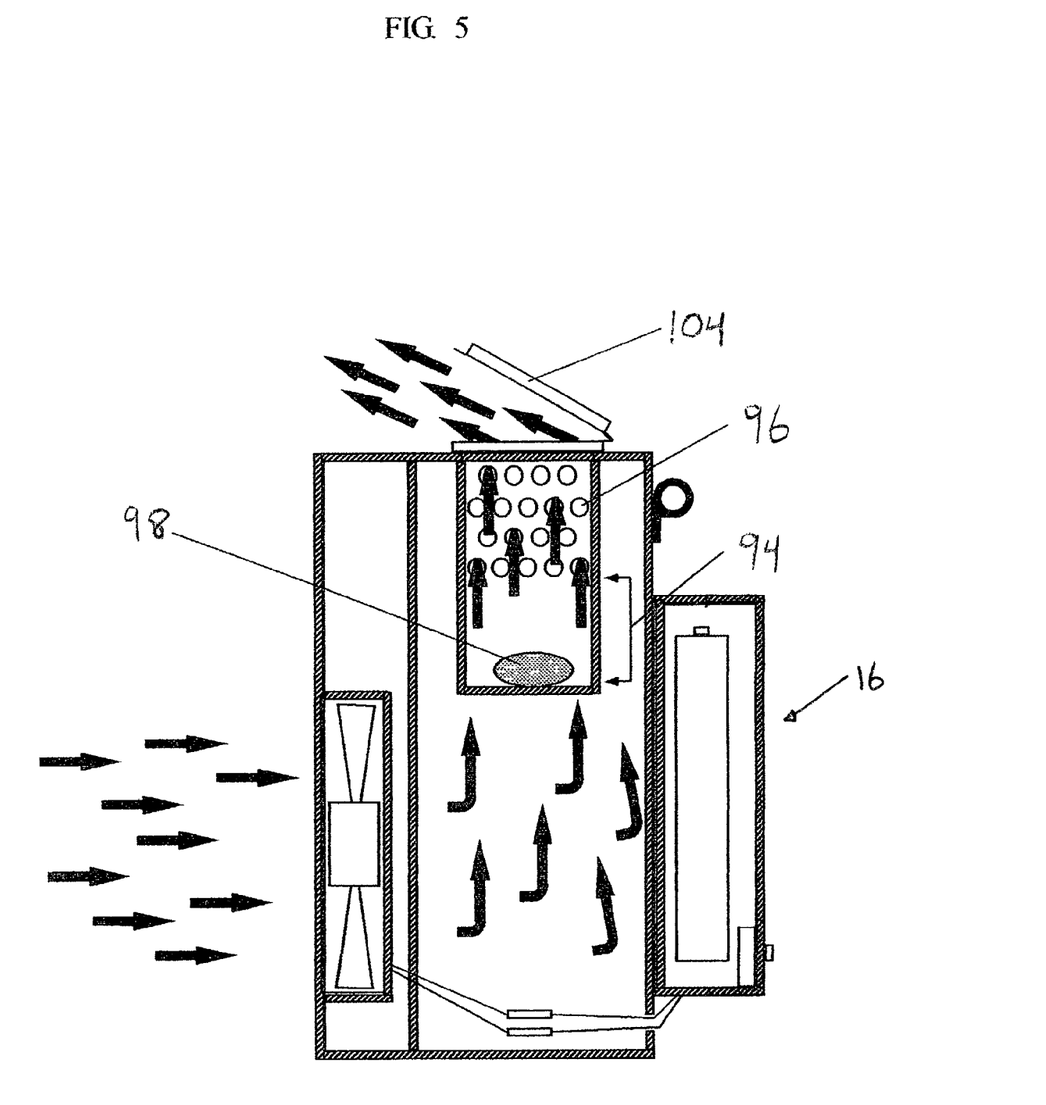
FIG. 5 is a diagrammatic operational view of a scent dispenser taken along line 2—2 of FIG. 1 embodying the present invention.
Figure 6:
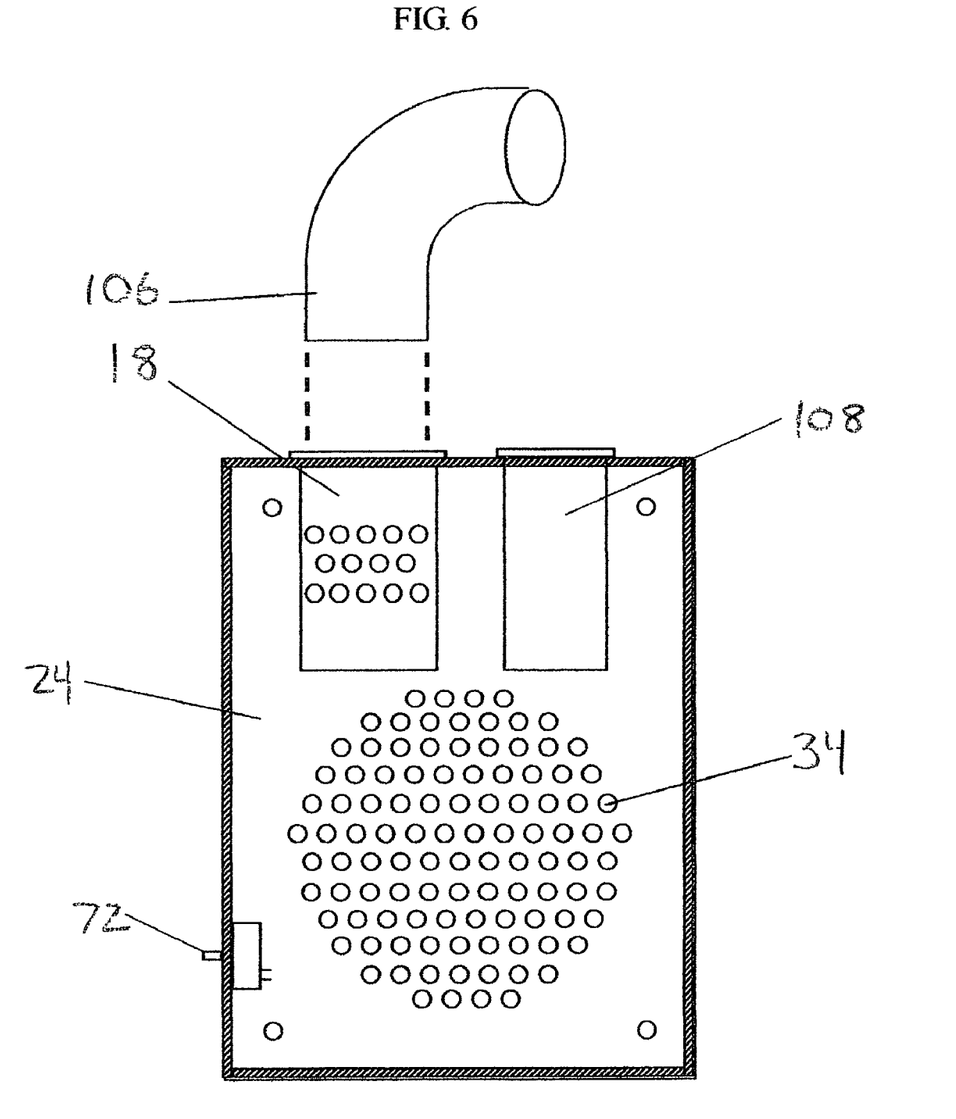
FIG. 6 is a diagrammatic front view of an alternative embodiment of a scent dispenser embodying the present invention.
Figure 7:
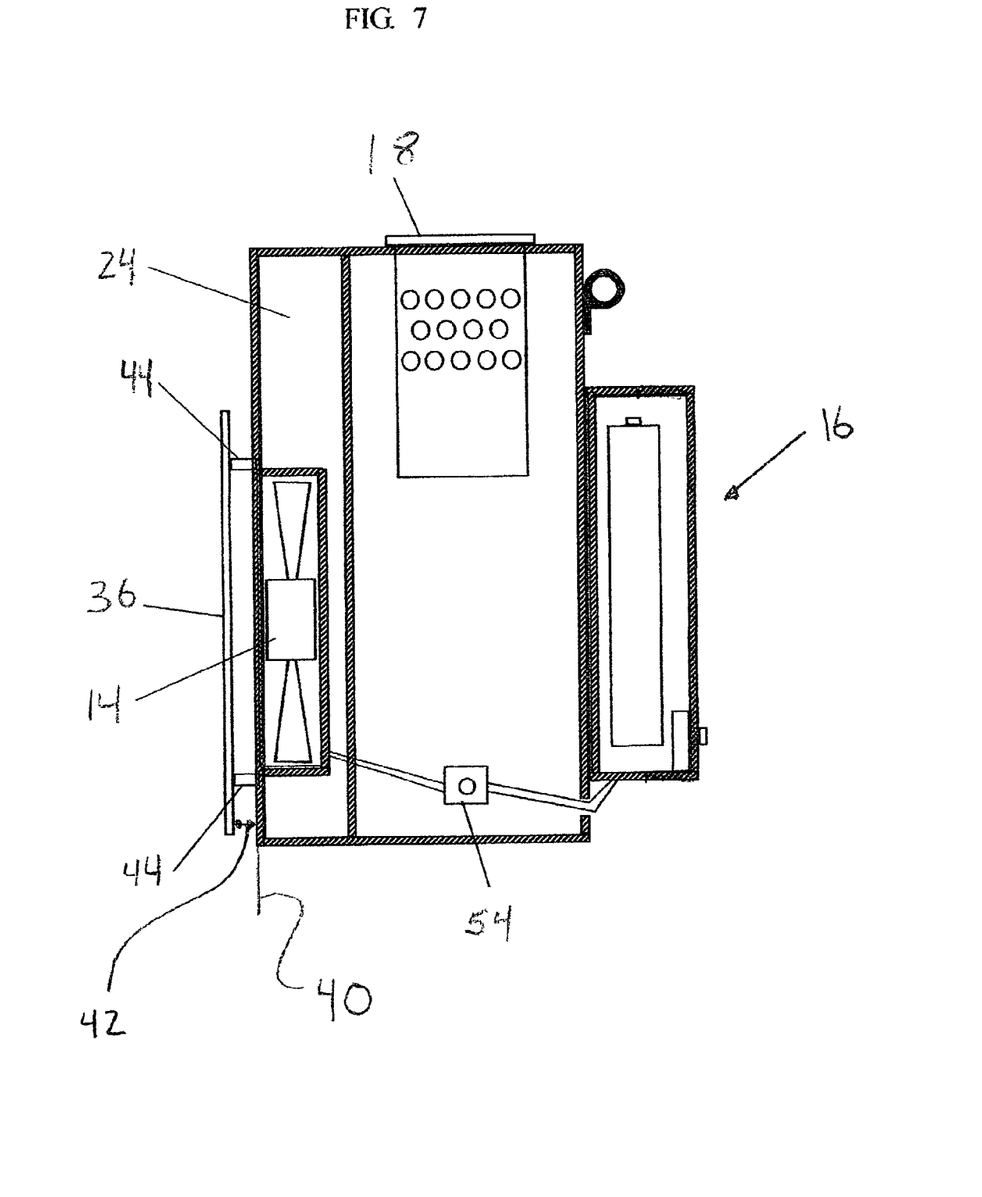
FIG. 7 is a diagrammatic lateral cross-sectional view of an alternative embodiment of a scent dispenser taken along line 2—2 of FIG. 1 embodying the present invention.

The housing (12) includes four bi-lateral walls (20), a bottom wall (22), & a housing cover (24) which are typically formed from polycarbonate. However, the housing (12) can be formed by a number of rigid materials such as, but not limited to, aluminum, ABS, polystyrene, and other plastic materials that are well known in the art. The housing cover (24) attaches to the housing (12) by fasteners (26), preferably screws, but other fasteners (26) could suffice. The housing cover (24) has an air intake port (28). The air intake port (28) is defined by a first curvilinear bore (30) and a longitudinal axis (32). The air intake port (28) is generally centrally aligned with respect to the housing cover (24). While an air intake port (28) being generally centrally aligned is illustrated in FIG. 1 and described herein, it should be understood that the invention is applicable to other types of air intake ports (28), such as a plurality of perforation (34) as shown in FIG. 6, or non-centrally aligned air intake port (28). Depending on environmental conditions protection of the air intake port configuration (28) may be required. For example, if hunters are in an area where environmental characteristics, such as rain, snow, bugs and/or dust are prevalent then using an air intake port (28) defined by the plurality of perforations (34) may be beneficial. The plurality of perforations (34) protects the residual free scent dispenser from the environmental characteristics while maintaining proper air flow which will be discussed in greater detail below. An alternative uses an air intake port cover (36), as shown in FIG. 7. The housing cover (24) has an edge (38), as shown in FIG. 1, which defines a plane (40). The air intake port cover (36) is spaced a first predetermined distance (42) from the plane (40) of the housing cover (24). The air intake port cover (36) is generally a solid piece of material that would be larger than the dimensions of the air intake port (28). The first predetermined distance (42) between the air intake port cover (36) and the plane (40), i.e., the housing cover (24) is created by using stand-off screws/posts (44). This first predetermined distance (42) allows for air to enter the residual free scent dispenser (10) while also protecting the air intake port (28) from environmental conditions. The stand-off screws/posts (44) are used to secure the air intake port cover (36) to the housing cover (24). As illustrated in FIG. 1, one of the bilateral walls (20) defines a mounting surface (46). The mounting surface (46) has an air exhaust port (48). The air exhaust port (48) is defined by a second curvilinear bore (50) and an axial axis (52). While the first and second curvilinear bores (30, 50) are illustrated and described herein, it should be understood that the invention is applicable to other types of bores (30, 50), such as oval or square surfaces. A DC fan (14), as shown in FIG. 1, provides air flow from the air intake port (28) to the air exhaust port (48). The power pack (16) for the fan (14) is typically powered using batteries (56). Having the fan (14) powered by batteries allows hunters and the like to use the residual free scent dispenser (10) in remote locations. It should be recognized, fans (14) powered by other power sources, such as, AC or solar cell (s) may be used without departing from the spirit of the invention. The fan (14) is fastened to the housing cover (24) using an adhesive cement or other fastening devices, such as fasteners, that are well known in the art. The fan (14) is generally positioned adjacent to the air intake port (28) and draws air into the residual free scent dispenser (10), as illustrated in FIG. 4 and FIG. 5. This flow of air enhances the scent distribution to aid in attracting wild game. A potentiometer/rheostat (54) is illustrated in FIG. 7 connected inline with the batteries (56) allows variable speeds of the fan (14) to be utilized. A Fan housing (58), as shown in FIG. 2, encases the fan (14). Fan wires (60) extend from the fan (14) through the fan housing (58) and fasten into corresponding wire connectors (62). Battery wires (64) extend from a battery holder (68) through an aperture (70) located on the bottom wall (22) of the housing (12) and fasten into corresponding wire connectors (62). The battery holder (68) is fastened onto the rear wall of the housing (12) using fasteners, such as, screws. As mentioned previously, other fasteners may be used that are well known in the art. The battery holder (68) includes a switch (72) for energizing and de-energizing the fan (14). The switch (72) is a slide type. However, switches (72) capable of breaking the circuit between the batteries (56) or other compatible power supplies and the fan (14) could be used. The battery holder also includes a cover (74). The cover (74) allows access to the batteries for replacement. The battery holder (68) typically is removable by sliding the battery holder (68) away from the cover (74). However, other battery holders (68) may be used without departing from the spirit of the invention. A hanging apparatus (76) is fastened to the bottom wall (22) of the housing (12) using a hanging apparatus fastener (78), which is preferably a button head rivet. Likewise, any number of fasteners could be substituted such as bolts, screws, permanent adhesives and other similar items that are well known in the art. The preferred hanging apparatus (76) is a nylon cable clamp. However, a variety of different hanging apparatus (76) would suffice, such as, eye bolts, hooks, screw eyes, and S-hooks. A length of wire, plastic cord, twine, cable, rope, and other material that is well known in the art may be looped through the hanging apparatus (76) to allow the residual free scent dispenser (10) to be elevated by hanging on a tree limb, bush, fence, or anything suitable for such elevation. The location of the hanging apparatus (76) is such that center of gravity allows for proper air circulation either being suspended in the air or resting on a surface such as the ground or the fork of a tree. In some situation, hunters may want to locate the residual free scent dispenser (10) in low-light or dark conditions without having light emitting from the residual free scent dispenser (10). A reflective material (80), as illustrated in FIG. 1 and FIG. 2, is permanently fastened to the housing cover (24) and the battery holder (68). The preferred reflective material (80) is a pressure-sensitive tape, but materials that reflect light could be used, such as, reflective tacks, reflective cloth, reflective twist-ties, reflective vinyl, reflective paint, plastic reflectors, and the like.

Figure 9:
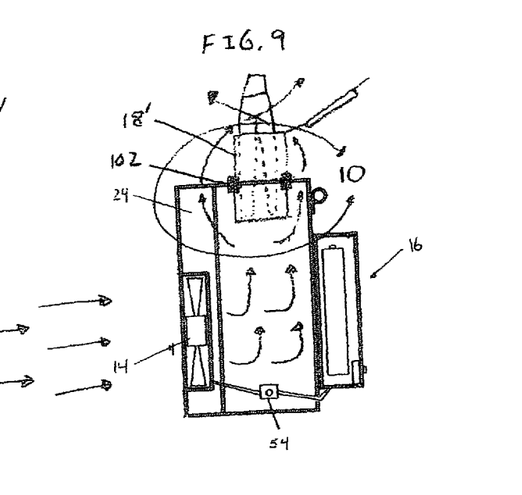
FIG. 9 is a diagrammatic lateral cross-sectional view of an alternative embodiment of a scent dispenser taken along line 9—9 of FIG. 8 embodying the present invention.

As illustrated in FIG. 1, a scent container (18) is preferably made from polypropylene and has a third bore (84) defined by a cylindrical surface (86) and a second axial axis (88). It should be recognized, the scent container (18) may be made of non-permeable materials, such as, polystyrene, polyethylene, aluminum, and the like that are well know in the art. While the third bore (84) with a cylindrical surface (86) is illustrated and described herein, it should be understood that the invention is applicable to other types of bores (84), such as, oval or square surfaces. The third bore (84) of the scent container (18) has a closed end surface (90) and is defined by a first portion (92) and a scent retention reservoir (94). The scent container (18) has at least on perforation (96) disposed therein and opening into the third bore (84). The at least one perforation (96) passes air flow from the air intake port to the third bore (84) as shown in FIG. 4 & FIG. 5. The air flow continues through the third bore (84) and exits the residual free scent dispenser (10). The at least one perforation (96) may encompass the circumference of the scent container (18) about the first portion (92). The at least one perforation (96) is preferably cylindrical. However, scent containers (18) utilizing square, triangular, elongated vertical slits, and the like that are well known in the art may be used without departing from the spirit of the invention. The scent container (18) has a scent permeating material (98) disposed in the scent retention reservoir (94). The scent permeating material (98) may be confined to the scent retention reservoir (94) based on the type of scent transmission used. For example, liquid or gel type of scent permeating material (98) would need to remain in the scent retention reservoir to eliminate contamination of the residual free scent dispenser (10). In contrast, if a wick type scent permeating material (98), such as, cotton, felt, sponge, ceramic disks, or cloth are used then it would generally extend into the first portion (92) of the third bore (84). It should be recognized that hunters may require multiple scent containers (18). For example, hunters may use a scent container with a scent permeating material (98) for certain environmental conditions, such as, time of day and humidity. When environmental conditions change hunters adjust scents by changing to a second scent container (18) with a second scent permeating material (98). The scent container (18) has a flange (100) disposed about the first portion (92) of the third bore (84). The scent container (18) is moveably extended into the air exhaust port (48) until the flange (100) engages the mounting surface (46) of the housing (12), as illustrated in FIG. 2. Although this is the preferred method of securing the scent container (18), similar results could be achieved by disposing a rubber grommet (102) about said second curvilinear bore (50) as shown in FIG. 9. Insertion of the scent container (18) into the second curvilinear bore (50) generally provides sealing engagement between the scent container (18) and the rubber grommet (102). The scent container (18) has an attached lid (104) that is molded into the scent container (18). The lid (104) is in hinged engagement with the scent container (18) to allow for various positions to be maintained, as illustrated in FIG. 5. An alternative to using a lid (104) is illustrated in FIG. 6. A weather guard (106) would be inserted into the scent container (18). For example, a 90 degree weather guard would allow for protection from rain and snow entering the scent container (18). The typical method for fastening the weather guard (106) to the scent container (18) is to have generally compression engagement between the weather guard (106) and the scent container (18). In some applications it would be desirable to transport the residual free scent dispenser (10) with the scent permeating material (98). FIG. 6 illustrates the use of a transport container (108) in addition to the scent container (18) that has been previously discussed. The transport container (108) would be constructed of a solid non-permeating material, as discussed with the scent container (18) and have a lid (104) for sealed protection during transport.

Figure 8:
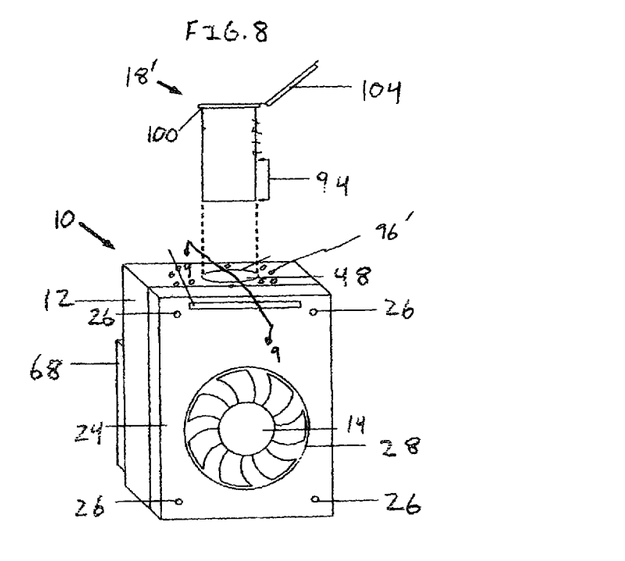
FIG. 8 is a diagrammatic view of an alternative embodiment of a scent dispenser embodying the present invention.
Figure 10:
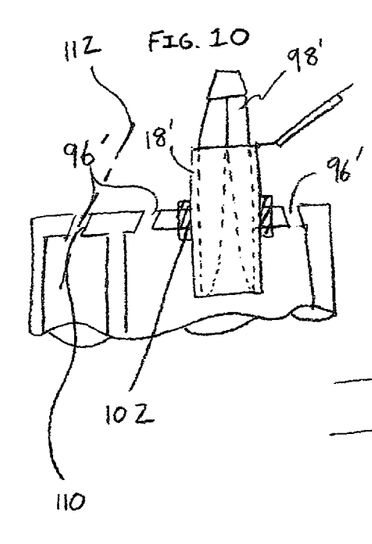
FIG. 10 is diagrammatic exploded partial cross-sectional view of a portion of a scent dispenser embodying the present invention.

FIG. 8, FIG. 9, and FIG. 10 show another embodiment of the instant invention. The mounting surface (46) has at least one perforation (96') disposed therein. In this embodiment, the scent container (18') is constructed of a solid non-permeating material, as discussed previously. The scent container (18') has a scent permeating material (98') generally extending beyond the mounting surface (46). As shown in FIG. 9, the air that is drawn in by the fan (14) is passed through the at least one perforation (96') and continues to flow past the scent permeating material (98'). The at least one perforation (96') each define a third curvilinear surface (110) and a third axial axis (112). The third axial axis (112) is generally at an acute angle with the axial axis (52) of the exhaust port (48). The relationship between the axial axis (52) and the third axial axis (112) provides more direct air flow over the permeating material (98'). However, it should be recognized that having the axial axis (52) and the third axial axis (112) in a parallel relationship would not depart from the spirit of the invention. Further, it should be understood that each perforation (96') may be at different angles without departing from the spirit of the invention. Different angles between each of the at least one perforation (96') provide different flow characteristics, such as, swirl.

INDUSTRIAL APPLICABILITY

With reference to the Figs. And in operation, elimination of leftover scent residue inside the residual free scent dispenser (10) is prevented by using the scent container (18). The scent container (18) improves changing of scents when out hunting by allowing one scent container (18) to be replaced by another scent container (18) without having cross-contamination of the residual free scent dispenser (10). Using the scent container (18) not only eliminates cross-contamination but also eliminates the inconvenience of cleaning and deodorizing the residual free scent dispenser (10).

In operation, the scent permeating material (98) is saturated with a preferred animal attracting scent producing compound. Scent producing compound or lure can be many forms as long as it can fit within the scent container (18). For instance, a slice of apple could be used or a simple tree twig could be used to apply a gel compound. The next step would be to place the scent producing compound inside the scent container (18) resting in the scent retention reservoir (94) which is designed to retain scent compound from entering into the housing (12). The scent container (18) is disposed into the air exhaust port (48) having the flange (100) rest on the mounting surface (46). The fan (14) is then energized by activating the switch (72). The fan (14) draws air into the housing when energized which is then communicated through at least one perforation (96) of the scent container (18) and over the scent permeating material (98) disposed in the third bore (84). In another aspect of the instant invention, the fan (14) draws air into the housing when energized which is then communicated through at least one perforation (96') of the mounting surface (46), returned to the environment, and then over the scent permeating material (98').

Following is a method of changing scents in the field having the scent container (18) with the scent permeating material and the second scent container (18) with the second scent permeating material (98). The housing (12) of the residual free scent dispenser (10) has the scent container (18) disposed in the air exhaust port (48) and the fan (14) is energized and fastened thereto. The fan (72) is de-energized using the switch (72). The scent container (18) is removed from the air exhaust port (48). The second scent container (18) is placed into the air exhaust port (48) and the fan (14) is energized using the switch (72).

The residual free scent dispenser (10) using the scent container (18) provides an extremely effective way of dispersing scent. Switching different scents is easy and convenient as well as practical both in and out of the field without the need for decontamination. Location and retrieval is easy with the use of the hanging apparatus (76) and reflective material (80). Changing the batteries (56) is convenient. The use of the air intake port cover (36), plurality of perforations (34), the lid (104) and the weather guard (106) provide additional protection from environmental elements.

Other aspects, objects and advantages of this invention can be obtained from a study of the drawings, the disclosure, and the appended claims.

What is claimed is:

1. A residual free scent dispenser, comprising:
   a housing having a mounting surface and at least one air intake port, each of said at least one air intake port being defined by a first curvilinear bore and a longitudinal axis, said mounting surface having an air exhaust port being defined by a second curvilinear bore and an axial axis;
   a scent container having a third bore defined by a cylindrical surface and a second axial axis, at least one perforation being disposed in said cylindrical surface of said scent container and opening into said third bore, said scent container being moveably extendable into said housing through said air exhaust port, whereby moveably extending said scent container through said exhaust port positions said at least one perforation of said scent container in said housing and generally aligns said third bore and said exhaust port; and
   a fan being fastened to said housing, said fan having an energized state adapted to induce air flow into said scent container from said housing, wherein in said energized state air only enters said housing through said at least one air intake port of said housing, and wherein in said energized state said scent container only permits air to flow into said third bore of said scent container through each of said at least one perforation of said scent container, and wherein in said energized state all of said air flow passes into said scent container and is discharged directly to atmosphere.

2. The residual free scent dispenser, as set forth in claim 1, wherein said scent container includes a flange being in engagement with said mounting surface.

3. A residual free scent dispenser, comprising:
   a housing having a mounting surface and at least one air intake port, each of said at least one air intake port being defined by a first curvilinear bore and a longitudinal axis, said mounting surface having an air exhaust port being defined by a second curvilinear bore and an axial axis;
   a scent container having a lid and said lid being in hinged engagement with said scent container, said scent container having a third bore defined by a cylindrical surface and a second axial axis, at least one perforation being disposed in said cylindrical surface of said scent container and opening into said third bore, said scent container being moveably extendable into said housing through said air exhaust port, whereby moveably extending said scent container through said exhaust port positions said at least one perforation of said scent container in said housing and generally aligns said third bore and said exhaust port; and
   a fan being fastened to said housing, said fan having an energized state adapted to induce air flow into said scent container from said housing, wherein in said energized state air only enters said housing through said at least one air intake port of said housing, and wherein in said energized state said scent container only permits air to flow into said third bore of said scent container through each of said at least one perforation of said scent container, and wherein in said energized state all of said air flow passes into said scent container and is discharged directly to atmosphere.

4. The residual free scent dispenser, as set forth in claim 1, wherein said third bore is defined by a first portion of said cylindrical surface and a scent retention reservoir, said at least one perforation being disposed about said first portion.

5. The residual free scent dispenser, as set forth in claim 4, wherein said scent container includes a scent permeating material disposed in said scent retention reservoir, said scent permeating material generally extending into said first portion.

6. The residual free scent dispenser, as set forth in claim 4, wherein said scent container includes a scent permeating material disposed in said scent retention reservoir.

7. The residual free scent dispenser, as set forth in claim 1, wherein said air intake port is defined by a plurality of perforations.

8. A residual free scent dispenser, comprising:
   a housing having an edge defining a plane, an air intake port cover being a first predetermined distance from said plane, and said air intake port cover being fastened to said housing, said housing further including a mounting surface and at least one air intake port, each of said at least one air intake port being defined by a first curvilinear bore and a longitudinal axis, said mounting surface having an air exhaust port being defined by a second curvilinear bore and an axial axis;
   a scent container having a third bore defined by a cylindrical surface and a second axial axis, at least one perforation being disposed in said cylindrical surface of said scent container and opening into said third bore, said scent container being moveably extendable into said housing through said air exhaust port, whereby moveably extending said scent container through said exhaust port positions said at least one perforation of said scent container in said housing and generally aligns said third bore and said exhaust port; and a fan being fastened to said housing, said fan having an energized state adapted to induce air flow into said scent container from said housing, wherein in said energized state air only enters said housing through said at least one air intake port of said housing, and wherein in said energized state said scent container only permits air to flow into said third bore of said scent container through each of said at least one perforation of said scent container, and wherein in said energized state all of said air flow passes into said scent container and is discharged directly to atmosphere.

9. The residual free scent dispenser, as set forth in claim 1, wherein said fan is fastened generally adjacent to said air intake port.

10. The residual free scent dispenser, as set forth in claim 9, wherein said fan is battery powered.

11. The residual free scent dispenser, as set forth in claim 9, wherein said fan is adapted to be intermittently energized.

12. The residual free scent dispenser, as set forth in claim 9, wherein said fan is adapted to have varying magnitudes of speed.

13. The residual free scent dispenser, as set forth in claim 1, wherein said housing includes a hanging apparatus attached to said housing and being adapted to hang said scent dispenser.

* * * * *